US007594550B2

(12) United States Patent
Chen

(10) Patent No.: US 7,594,550 B2
(45) Date of Patent: Sep. 29, 2009

(54) PNEUMATIC HAND TOOL

(75) Inventor: Chi-Chen Chen, Taiping (TW)

(73) Assignee: Year Congratulate Industrial Co., Ltd, Taiping (TW)

(*) Notice: Subject to any disclaimer, the term of this patent is extended or adjusted under 35 U.S.C. 154(b) by 0 days.

(21) Appl. No.: 12/186,599

(22) Filed: Aug. 6, 2008

(65) Prior Publication Data

US 2008/0283259 A1 Nov. 20, 2008

Related U.S. Application Data

(63) Continuation-in-part of application No. 11/524,897, filed on Sep. 22, 2006, now Pat. No. 7,458,429.

(51) Int. Cl.
*B23B 45/04* (2006.01)
*B23D 15/00* (2006.01)

(52) U.S. Cl. ....................... 173/104; 173/218; 173/107; 173/93.5

(58) Field of Classification Search ................. 173/218, 173/104, 93.5, 107, 168
See application file for complete search history.

(56) References Cited

U.S. PATENT DOCUMENTS 3,556,151 A * 1/1971 Masuda ................. 137/625.21
3,833,068 A * 9/1974 Hall ........................... 173/169
3,920,088 A * 11/1975 Dudek ......................... 173/169
3,924,961 A * 12/1975 Hess et al. ..................... 415/32
3,945,465 A * 3/1976 Vander Horst et al. ...... 184/6.24
4,165,203 A * 8/1979 Latzina et al. .............. 415/113
4,258,799 A * 3/1981 Eckman ...................... 173/169
4,384,668 A * 5/1983 Tutomu et al. ................. 227/8
4,416,338 A * 11/1983 Nelson et al. ............... 173/206
5,083,619 A * 1/1992 Giardino et al. ............... 173/93
5,687,802 A * 11/1997 Spooner et al. ............. 173/169
6,044,917 A * 4/2000 Brunhoelzl ................ 173/93.5
6,047,780 A * 4/2000 Lin ............................ 173/168
6,062,323 A * 5/2000 Pusateri et al. .............. 173/169
6,401,836 B1 * 6/2002 Heinrichs et al. ............. 173/93
2006/0090914 A1 * 5/2006 Lin et al. .................... 173/168
2006/0191696 A1 * 8/2006 Lin et al. .................... 173/104

* cited by examiner

*Primary Examiner*—Brian D Nash
(74) *Attorney, Agent, or Firm*—Ming Chow; Sinorica, LLC

(57) ABSTRACT

A compact pneumatic hand tool having a cylinder assembly received in a space of a body, wherein, the bottom inlet opening of the cylinder assembly is communicated with the air inlet in the space, meanwhile, the rear inlet passage of the cylinder assembly is corresponded to the control knob mounting portion of the body. Moreover, a control knob is extended through the control knob mounting portion of body as well as the rear inlet passage of the cylinder assembly, and a rotor of the cylinder assembly is coupled with a second coupling portion of a striking assembly. In addition, the front opening of the body is covered with the front cap and a sealing pad is provided between the body and the front cap, meanwhile the central axle is extended out of the front cap. With the existence of the sealing pad between the boy and the front cap, the cylinder assembly, the control knob and the striking assembly and are sealingly sealed between the front cap and the body, which enhances the airtight capability and the convenience of use.

10 Claims, 6 Drawing Sheets

PNEUMATIC HAND TOOL

RELATED APPLICATION

This application is a Continuation-In-Part Application of Ser. No. 11/524,897, filed Sep. 22, 2006, and entitled "PNEUMATIC HAND TOOL" now U.S. Pat. No. 7,458,429.

BACKGROUND OF THE INVENTION

1. Field of the Invention

The present invention relates to a pneumatic hand tool. More particularly, the present invention relates to a pneumatic hand tool which is compact in weight and low cost.

2. Description of Related Art

The current available pneumatic hand tool is shown in FIG. 6, which includes a body (60), a cylinder (61), a rotor (62), a bearing (63), a sealing cap (64) and a control knob (65). The conventional pneumatic hand tool as shown is characterized in that the sealing cap (64) is firmly secured to a rear side of the body (60) so as to tightly encase and position the cylinder (61), the rotor (62) and the bearing (63) inside the body (60). The sealing cap (64) is provided with an inlet passage and a pair of mutually corresponding air conducting passages incorporative with the control knob (65) to control and adjust the air path and air volume entering the cylinder (61). Accordingly, the rotation direction and rotational torque of the pneumatic hand tool are controlled. However, the conventional pneumatic hand tool has contained some improvable defects, such as:

1. Poor airtight capability: Due to the control knob (65) and the cylinder (61) are separated, so as there is a possibility that the clearances existed between the control knob (65) and the cylinder (61) when they are assembled inside the body (60), which results in a poor airtight effect;

2. High manufacture cost: Due to the control knob (65) and the cylinder (61) are separated, so as the body (6) is limited to be made of a metallic material to enhance its airtight capability, and that could cause a higher manufacture cost; and 3. Inconvenience in operation: Due to the control knob (65) and the cylinder (61) are separated, so as the body (6) is limited to be made of a metallic material to enhance the safety requirement, and that leads to the increase of weight of the hand tool, further to influent the operation of the hand tool.

The present invention is intended to improve the above mentioned drawbacks of the conventional pneumatic hand tool. The present invention provides improved solutions to the problems of poor airtight capability, high manufacturing cost and inconvenience in operation.

SUMMARY OF THE INVENTION

The primary objective of the present invention is to provide a compact pneumatic hand tool composed of a body, a cylinder assembly, a control knob, a striking assembly and a front cap. The body has a front opening, a space defined in a front portion thereof to communicate with the front opening, an air inlet positioned at the bottom of the space, and a closed rear end of the body provided with a control knob mounting portion and fastener inserting holes. A rotor is received in a cylinder of the cylinder assembly and the cylinder comprises a rear inlet passage and a bottom inlet opening thereof. The striking assembly has a central axle extending from a first side thereof and a second coupling portion extending a second side thereof. The cylinder assembly is assembled inside of the space of the body, so as the bottom inlet opening of the cylinder assembly and the air inlet of the body are communicated, meanwhile the rear inlet passage of the cylinder assembly and the control knob mounting portion of the closed rear end are corresponded to each other, in order for the control knob to insert through the mounting portion of the closed rear end and the rear inlet passage of the cylinder assembly. The rotor of the cylinder assembly is coupled with the second coupling portion of the striking assembly. The front opening of the body is covered with the front cap and a sealing pad is provided between the body and the front cap, meanwhile the central axle is extended out of the front cap. With the existence of the sealing pad between the boy and the front cap, the cylinder assembly, the control knob and the striking assembly and are sealingly sealed between the front cap and the body, which enhances the airtight capability and the convenience of use of the present invention.

Other objects, advantages and novel features of the invention will become more apparent from the following detailed description when taken in conjunction with the accompanying drawings.

DETAILED DESCRIPTION OF PREFERRED EMBODIMENT

Figure 1:
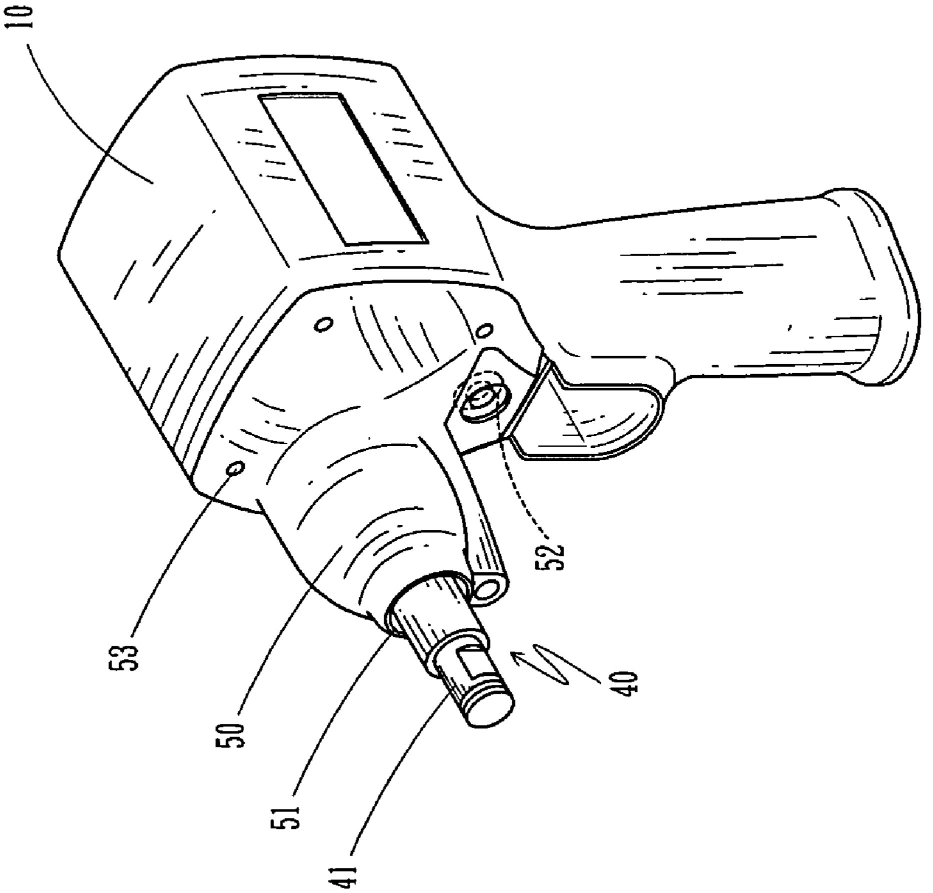
FIG. 1 is a perspective view of the pneumatic hand tool of the present invention.
Figure 2:
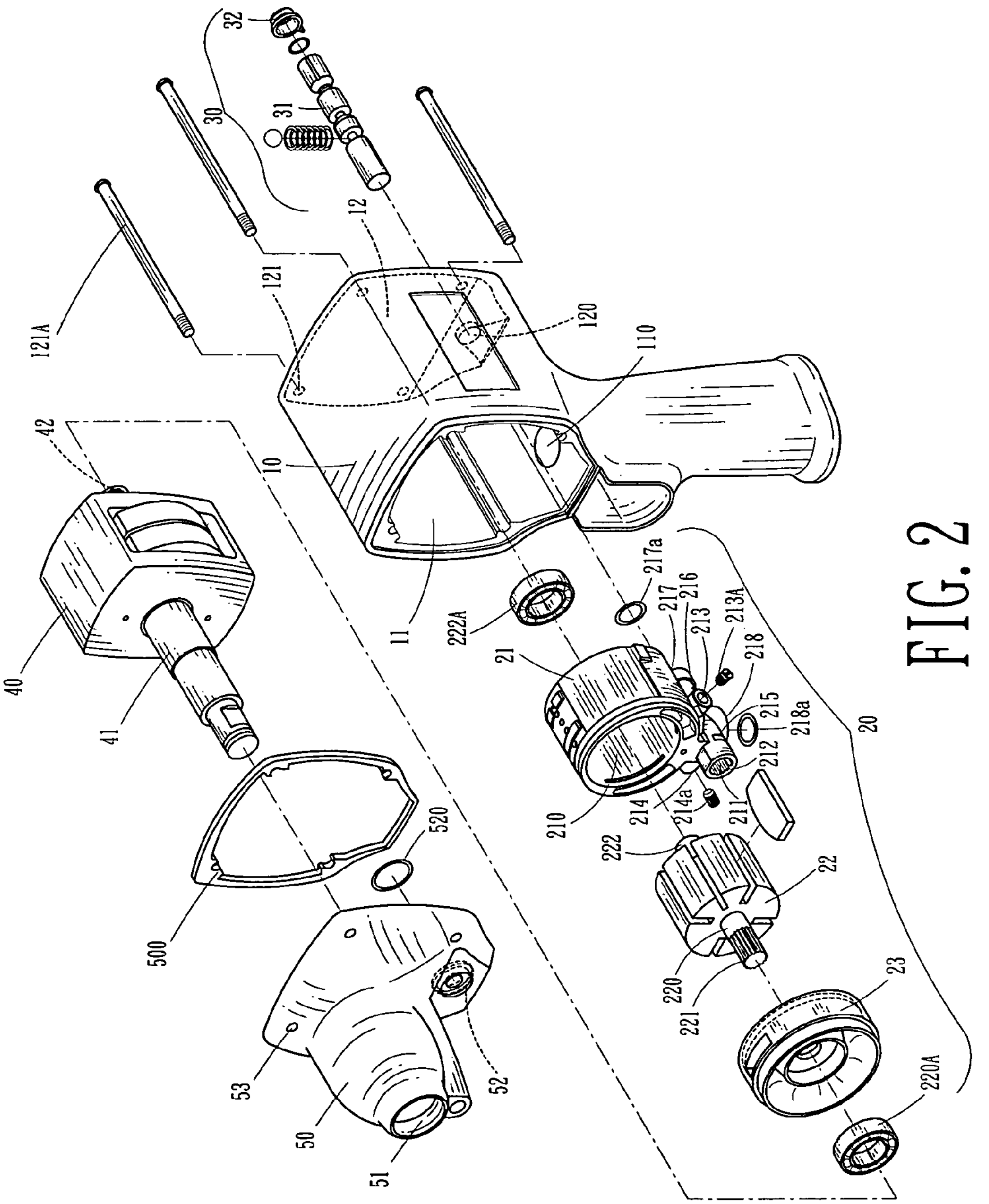
FIG. 2 is an exploded perspective view of the pneumatic hand tool of the present invention.
Figure 3:
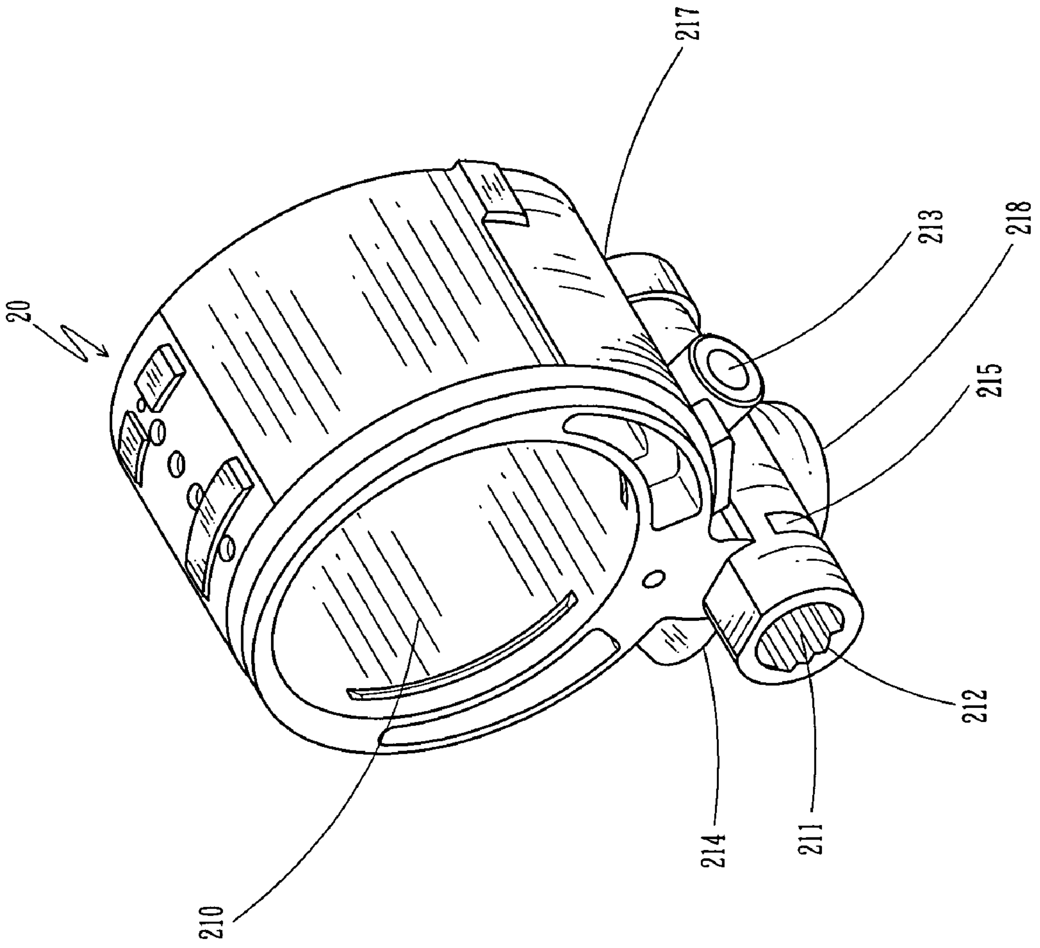
FIG. 3 is a perspective view of the cylinder of the pneumatic hand tool of the present invention.
Figure 4:
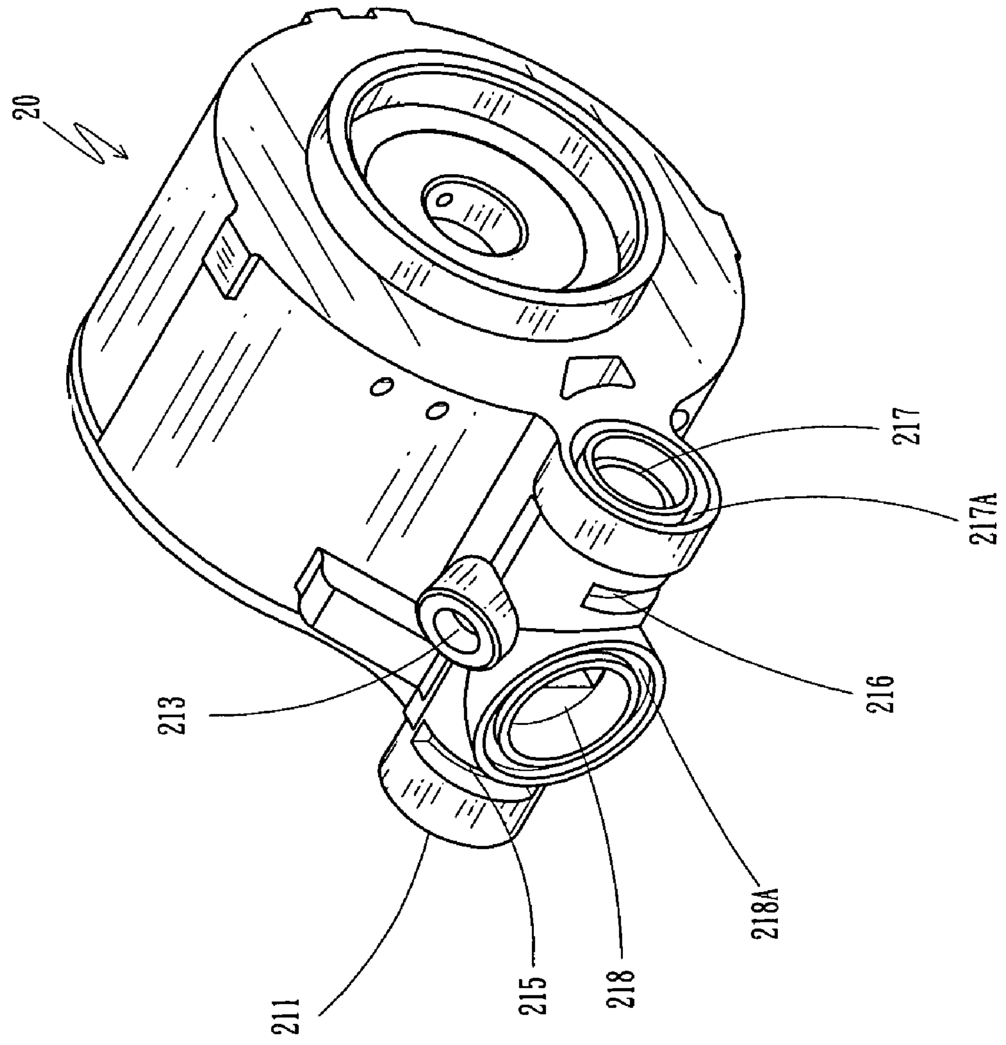
FIG. 4 is a perspective view of the cylinder of the pneumatic hand tool of the present invention from an angle different from that of FIG. 3.
Figure 5:
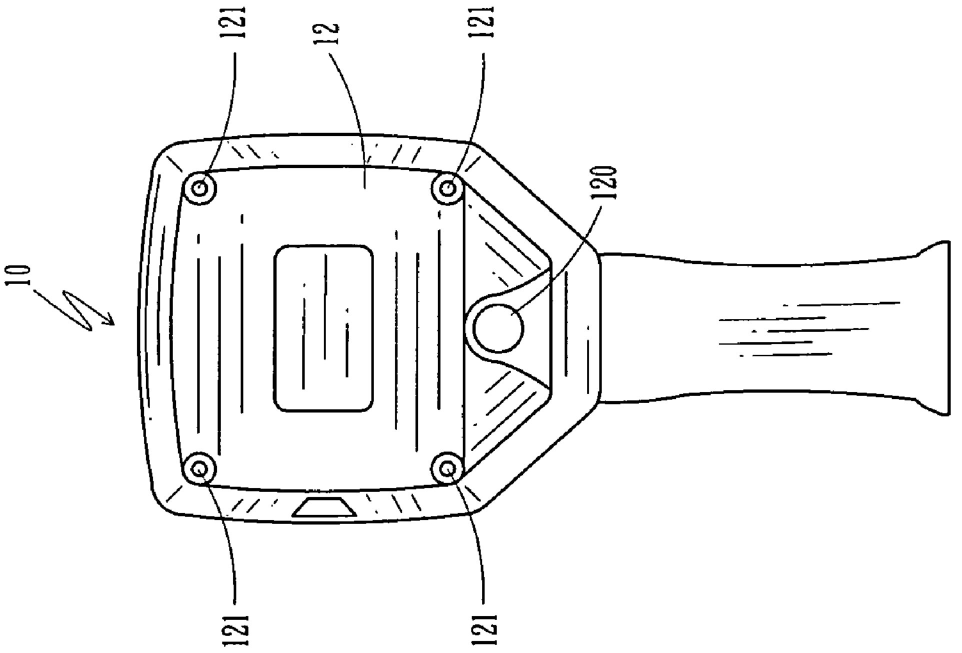
FIG. 5 is rear side plan view of the cylinder of the present invention.
Figure 6:
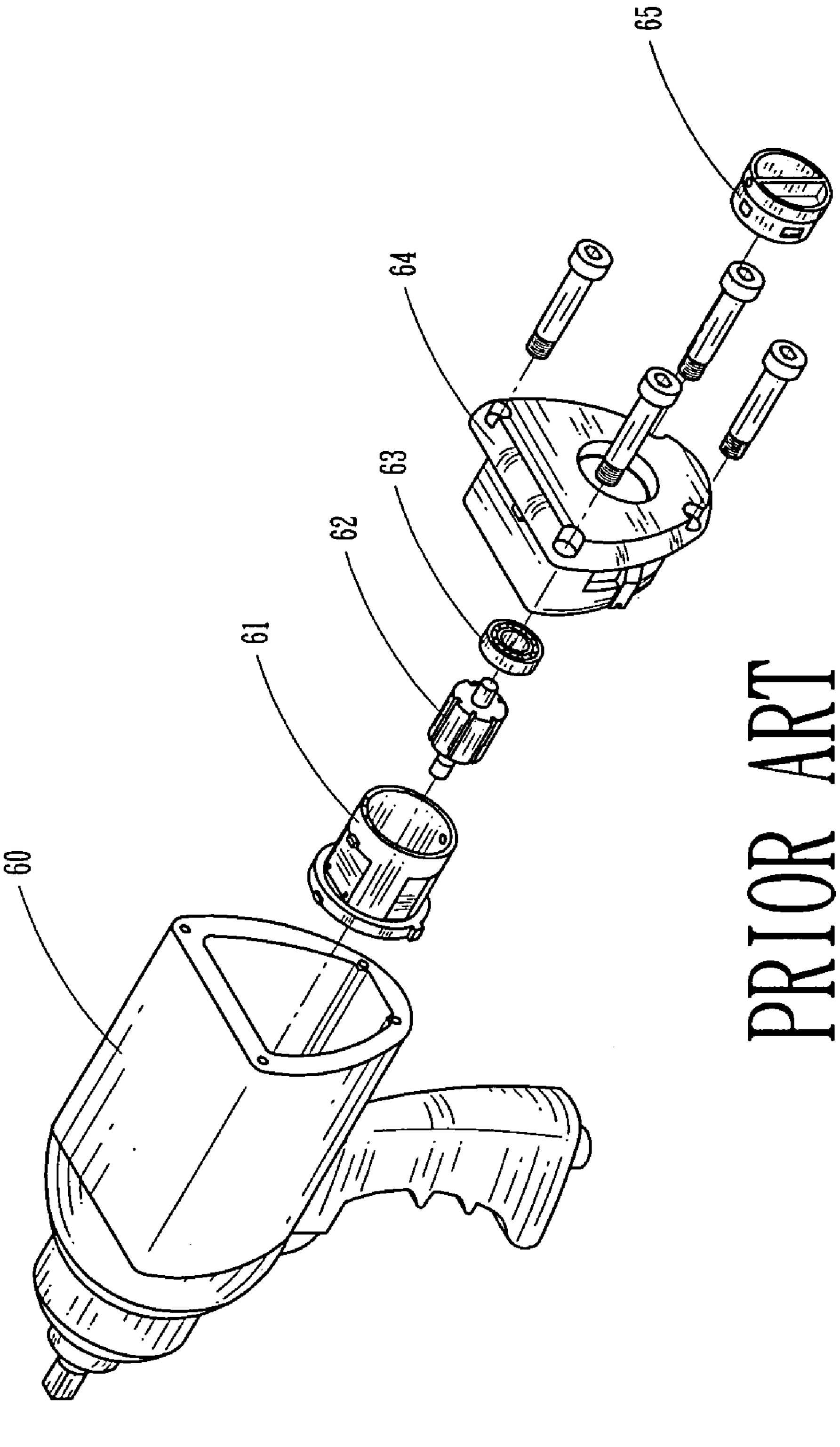
PRIOR ART FIG. 6
FIG. 6 is an exploded perspective view of a conventional pneumatic hand tool.

With reference to FIGS. 1 to 5, it is noted that the pneumatic hand tool in accordance with the present invention includes a body (10) having a space (11) defined in its front portion, an air inlet (110) positioned at the bottom of the space (11), and a closed rear end (12) of the body (10) provided with a control knob mounting portion (120) and the fastener inserting holes (121), wherein the fastener inserting holes (121) are provided for the fasteners (121A) to insert the holes (121). Preferably, the fasteners (121A) are the thread bolts (121A).

A cylinder assembly (20) is composed of a cylinder (21), a rotor (22) and a front cover (23). Wherein, the cylinder (21) is further composed of a receiving chamber (210), an inlet opening (211), an inner teething stopper (212), a left inlet (213), a right inlet (214), a front exhaust opening (215), a middle exhaust opening (216), a rear inlet passage (217) and a bottom inlet opening (218). The front exhaust opening (215) and the middle exhaust opening (216) are situated between the inlet opening (211) and the rear inlet passage (217), moreover, the left inlet (213) and the right inlet (214) are situated at the two sides of the bottom inlet opening (218). A first leakproof portion (217A) is assembled to the rear inlet passage (217), and a second leakproof portion (218A) is assembled to the bottom inlet opening (218), the first leakproof portion (217A) and the second leakproof portion (218A) respectively have the airtight seal (217*a*) (218*a*). When the rear inlet passage (217) is corresponded to the control knob mounting portion (120) of the body (10), the airtight seal (217*a*) of the first leakproof portion (217A) is sealingly sealed between the rear inlet passage (217) and the closed rear end (12) of the body (10), and when the bottom inlet opening (218) is communicated with air inlet (110) of the body (10), the airtight seal (218*a*) of the second leakproof portion (218A) is sealingly sealed between the bottom inlet opening (218) and the air inlet (110) of the body (10). The inner teething stopper (212) is situated at the front end of the inlet opening (211), and the left inlet (213) and the right inlet (214) are sealed with a airtight screw (213A)(214A) respectively. Furthermore, the rear inlet passage (217) and the control knob mounting portion (120) of the body (10) are corresponded to each other, and the bottom inlet opening (218) are communicated with the air inlet (110) which is situated inside the space (11) of the body (10). The rotor receiving chamber (210) is defined to receive therein the rotor (22), and a front cover (23) is mounted on the front opening of the receiving chamber (210) of the cylinder (21). The rotor (22) has a front shaft (220) provided with a first coupling portion (221), a rear shaft (222) extending from a rear side of the rotor (22). The front shaft (220) extends through the front cover (23) to have the first bearing (220A) mounted therearound and the rear shaft (222) extends through the cylinder (21) to have the second bearing (222A) mounted therearound. The cylinder assembly (20) is received in the space (11) of the body (10).

The control knob (30) comprises an air plug (31) and an adjustment knob (32), wherein the air plug (31) is extended through the control knob mounting portion (120) as well as the rear inlet passage (217) of the cylinder (21), and extended out of the inlet opening (211) of the cylinder (21). The adjustment knob (32) is coupled with the control knob mounting portion (120) of the closed rear end (12), and the end of the air plug (31) is coupled with the adjustment knob (32) tightly.

The striking assembly (40) has a central axle (41) extending from a first side thereof and a second coupling portion (42) extending from a second side thereof opposite to the first side to couple with the first coupling portion (221) of the front shaft (220).

The front cap (50) is covered to the front opening of the space (11), and a sealing pad (500) is sealed between the front cap (50) and the body (10). The front cap (50) comprises a through hole (51), an air plug stopper (52) and multiple apertures (53), wherein the through hole (51) defined in a front side thereof to allow extension of the central axle (41) therethrough, the air plug stopper (52) has a leakproof O-ring (520) and it is used for stopping the control knob (30) to extend out of the cylinder (21). The apertures (53) of the front cap (50) defined around a face thereof and corresponded to the inserting holes (121) of the body (10) to allow the extension of the fasteners (121A) after extending through the inserting holes (121) of the body (10) and apertures (53) of the front cap (50) to secure the engagement between the front cap (50) and the body (10).

With reference to FIGS. 2-5, which are exploded perspective view, sectional view and enlarged perspective views of the components of the present invention, it is noted that the body (10) includes a space (11) defined in its front portion, the air inlet (110) positioned at the bottom of the space (11) and the closed rear end (12) provided at the rear side of the body (10) with the control knob mounting portion (120). The rotor (22) is received in the cylinder assembly (20) and the cylinder assembly (20) is further composed of the rear inlet passage (217) and the bottom inlet opening (218). The striking assembly (40) comprises the central axle (41) and the second coupling portion (42) extending from the two sides of the striking assembly (40) individually. When the cylinder assembly (20) is assembled to the space (11) of the body (10), the bottom inlet opening (218) of the cylinder assembly (20) is communicated with the air inlet (110) of the body (10), and the rear inlet passage (217) of the cylinder assembly (20) is corresponded to the control mounting portion (120) of the closed rear end (12) simultaneously, so that the control knob (30) is able to extend through the control knob mounting portion (120) as well as the rear inlet passage (217). The rotor (22) of the cylinder assembly (20) is coupled with the second coupling portion (42) of the striking assembly (40). In addition, the front cap (50) is covered to the front opening of the space (11), and a sealing pad (500) is sealed between the front cap (50) and the body (10), meanwhile, the central axle (41) of the striking assembly (40) is extended out of the front cap (50). With the existence of the sealing pad (500) between the boy (10) and the front cap (50), the cylinder assembly (20), the control knob (30) and the striking assembly (40) and are sealingly sealed between the front cap (50) and the body (10).

In the light of the above, the advantages of the present invention include:

1. High airtight capability: Due to the control knob (30) is received in the cylinder assembly (20), so that the hand tool is operated under an airtight circumstance;

2. Cost saving: Due to the control knob (30) is installed in the cylinder assembly (20), so that the airtight capability can be ensured, and the body (10) of the hand tool is able to be made by the nonmetallic materials, which significantly reduces the manufacture cost; and 3. Convenience in operation: Due to the control knob (30) is installed in the cylinder assembly (20), so that the airtight capability can be ensure, and the body (10) of the hand tool is able to be made by the nonmetallic materials, a light weight and compact pneumatic hand tool is formed.

Although numerous characteristics and advantages of the present invention have been set forth in the foregoing description, together with details of the structure and function of the invention, this disclosure is one example only, and changes may be made with regard to specific details, particularly in matters of shape, size, and arrangement of parts within the invention to the full extent indicated by the general meaning of the terms in which the appended claims are expressed.

What is claimed is:

1. A pneumatic hand tool consisting essentially of:

a body having a space defined in a front portion thereof, an air inlet positioned in the space and a closed rear end of the body provided with a control knob mounting portion;

a cylinder assembly, which is composed of a cylinder, a rotor and a front cover; wherein, the cylinder is further composed of a receiving chamber, an inlet opening, a rear inlet passage and a bottom inlet opening; the rear inlet passage is corresponded to the control knob mounting portion of the body, and the bottom inlet opening is communicated with the air inlet which is situated in the space of the body; a rotor receiving chamber is defined to receive therein the rotor, and a front cover is mounted on the front opening of the cylinder; the rotor has a front shaft provided with a first coupling portion, and the cylinder assembly is received in the space of the body;

a control knob, which is composed of an air plug and an adjustment knob, wherein the air plug is extended through the control knob mounting portion of the closed rear end as well as the rear inlet passage of the cylinder, and extended out of the inlet opening of the cylinder; the adjustment knob is coupled with the control knob mounting portion of the closed rear end, and the end of the air plug is also coupled with the adjustment knob tightly;

a striking assembly has a central axle extending from a first side thereof and a second coupling portion extending a second side thereof opposite to the first side to couple with the first coupling portion of the front shaft; and a front cap, which is covered to the front opening of body having a through hole which allows the central axle of the striking assembly to extend therethrough.

2. The pneumatic hand tool as claimed in claim 1, wherein the body further comprises multiple inserting holes which are provided for the fasteners to insert the holes; the front cap further comprises multiple apertures which are corresponded to the inserting holes of the body, to allow the extension of the fasteners after extending through the inserting holes of the body and apertures of the front cap to secure the engagement between the front cap and the body.

3. The pneumatic hand tool as claimed in claim 2, wherein the fasteners are the thread bolts.

4. The pneumatic hand tool as claimed in claim 1, wherein the cylinder is further composed of an inner teething stopper, a front exhaust opening and a middle exhaust opening, wherein the inner teething stopper is situated at the front end of the inlet opening, and the front exhaust opening and the middle exhaust opening are situated between the inlet opening and the rear inlet passage.

5. The pneumatic hand tool as claimed in claim 1, wherein the cylinder is further composed of a left inlet and a right inlet, wherein the left inlet and the right inlet are situated at the two sides of the bottom inlet opening; a airtight screw is provided in the left inlet and right inlet respectively, which is used for sealing the air of both inlets.

6. The pneumatic hand tool as claimed in claim 1, wherein a first leakproof portion is assembled to the rear inlet passage and the first leakproof portion has a airtight seal; when the rear inlet passage is corresponded to the control knob mounting portion of the body, the airtight seal of the first leakproof portion is sealingly sealed between the rear inlet passage and the closed rear end of the body.

7. The pneumatic hand tool as claimed in claim 1, wherein a second leakproof portion is assembled to the bottom inlet opening and the second leakproof portion has a airtight seal; when the bottom inlet opening is communicated with air inlet of the body, the airtight seal of the second leakproof portion is sealingly sealed between the bottom inlet opening and the air inlet of the body.

8. The pneumatic hand tool as claimed in claim 1, wherein a rear shaft is extended from a rear side of the rotor and opposite to the front shaft; the front shaft extends through the front cover to have the first bearing mounted therearound and the rear shaft extends through the cylinder to have the second bearing mounted therearound.

9. The pneumatic hand tool as claimed in claim 1, wherein a sealing pad is sealed between the front cap and the body.

10. The pneumatic hand tool as claimed in claim 1, wherein an air plug stopper is situated under the through hole of the front cap which is used for stopping the control knob to extend out of the cylinder, and the air plug stopper has a leakproof O-ring.

* * * * *